(12) United States Patent
Cortese

(10) Patent No.: US 7,100,392 B2
(45) Date of Patent: Sep. 5, 2006

(54) MACHINE FOR PRODUCING GRANITA AND SIMILAR BEVERAGES

(75) Inventor: Paolo Cortese, Cercola (IT)

(73) Assignee: ELCOR S.R.L., S. Giorgio a Cremano (IT)

( * ) Notice: Subject to any disclaimer, the term of this patent is extended or adjusted under 35 U.S.C. 154(b) by 100 days.

(21) Appl. No.: 10/986,999

(22) Filed: Nov. 15, 2004

(65) Prior Publication Data

US 2005/0103030 A1 May 19, 2005

(30) Foreign Application Priority Data

Nov. 13, 2003 (IT) .......................... RM2003A0526

(51) Int. Cl.
*A23G 9/18* (2006.01)

(52) U.S. Cl. ......................... 62/343; 366/144

(58) Field of Classification Search .......... 62/342–343; 366/144, 293, 309, 325.7, 325.8, 325.9, 325.91, 366/325.93

See application file for complete search history.

(56) References Cited

U.S. PATENT DOCUMENTS

| | | | |
|---|---|---|---|
| 2,758,823 A * | 8/1956 | Vasby | 366/318 |
| 2,836,401 A * | 5/1958 | Phelan | 366/311 |
| 3,101,598 A | 8/1963 | Ross | |
| 3,133,428 A | 5/1964 | Schneider | |
| 4,900,158 A * | 2/1990 | Ugolini | 366/143 |
| 5,074,125 A * | 12/1991 | Schifferly | 62/342 |
| 5,788,370 A * | 8/1998 | Pedrazzi | 366/144 |
| 5,967,226 A * | 10/1999 | Choi | 165/63 |
| 6,058,721 A | 5/2000 | Midden et al. | |
| 6,176,090 B1 | 1/2001 | Ufema | |
| 6,918,258 B1 * | 7/2005 | Cunha et al. | 62/68 |

* cited by examiner

*Primary Examiner*—William E. Tapolcai
(74) *Attorney, Agent, or Firm*—Young & Thompson

(57) ABSTRACT

A granita production machine includes a bowl (2) designed to receive a water solution to be transformed into granita. The bowl (2), which is provided with a cover (3) and a granita dispensing tap (4), surrounds a cooling drum (11), being arranged orthogonally to the bottom (9) of the bowl (2) and crossed by a rotating shaft (13), which is driven around an axis (y) by a first geared motor (41). The shaft (13) carries removing structure to remove crystals of iced solution from the external surface of the cooling drum (11), including a scraping element (15) and a conveying element (16) connected together. A granita stirring vane (22), being rotated around an axis (y') by a second geared motor (23) housed in the same cover (3) is dependent inside the bowl (2).

8 Claims, 4 Drawing Sheets

MACHINE FOR PRODUCING GRANITA AND SIMILAR BEVERAGES

BACKGROUND OF THE INVENTION

The present invention relates to a machine for producing granita and similar beverages. The machine is especially designed for coffee granita production. Although here and in the following description reference is made only to an use of the machine for granita production, it should be appreciated that it may be used to contain and dispense other cold drinks.

In granita production machines a sugar-water solution, flavored with an essence, such as coffee or juice of lemon or other fruits, is stirred while it is cooled so that the resulting product is in a slush consistency of minute iced crystals. This is obtained in a bowl being extended in either horizontal or vertical direction, inside which a cooling body is generally in contact with the evaporator of a refrigeration circuit. This refrigeration circuit is contained in a casing of the same granita production machine.

In some of the machines nowadays available on the market, a horizontally elongated bowl, made of transparent material, contains the cooling body in the form of a drum which also is located horizontally on the bottom of the bowl.

The cooling drum houses a coil which is the evaporator of the refrigeration circuit. The crystals of iced solution for producing granita are continuously removed by an auger, which, being arranged concentrically to the cylinder and driven by a geared motor, skims the external side surface of the drum.

The granita machine of the above described kind works in a satisfactory way when the sugar solution in the bowl fills at least half the bowl so that the horizontal cooling drum is abundantly covered. Usually the capacity of a bowl is about 10–12 liters. When the contents in a bowl is less than 5 liters, as the machine incorporates too much air into the water solution during its operation, the obtained product becomes foamy and not more utilizable.

SUMMARY OF THE INVENTION

Therefore, a main object of the present invention is to ensure that a granita, in particular a coffee granita, can be produced even in small quantities without becoming foamy and consequently not acceptable for the consumer.

A further object is to keep the granita in a slush consistency, assuring its quality even if it is produced in small quantities.

According to the invention, a machine for producing granita and similar beverages, comprising a machine casing including a refrigeration circuit and an electrical circuitry for the machine control, and a bowl designed to receive a water solution to be transformed into a granita. The bowl has a bottom, a cover and a granita dispensing tap and contains a cooling drum with high heat-exchange. The cooling drum is crossed along its longitudinal axis by a rotating shaft to which removing means are mounted to remove by skimming the crystals of iced solution formed on the surface of the cooling drum. The cooling drum has its longitudinal axis lying substantially orthogonal to the bottom of the bowl, and said removing means includes at least one mainly scraping element situated on a longitudinal central plane with respect to the cooling drum and at least one mainly conveying element, which is inclined with respect to the mainly scraping element and connected thereto.

The orthogonal arrangement of the cooling drum according to the invention provides great advantages in comparison with the traditional horizontal arrangement with respect to the bowl bottom. First, it gives the opportunity to produce reduced quantities of granita having a satisfactory quality with respect to the maximal capacity of the machine and to keep anyway the product obtained in adequate consistency awaiting to be dispensed. Also, the performance of the dispensing tap is particularly suitable.

However, it should be appreciated that an upwards anyway inclined arrangement, different from the orthogonal one, with respect to the bottom of the bowl could achieve the same results even if constructively more difficult to be made. In fact, another advantage of the present invention is represented by a structural simplicity of the machine resulting from the arrangement of the bowl and from the devices within it. Further, the machine is so easy to be disassembled, serviced and cleaned, that these operations can be performed directly by the user, without any tool.

The present invention will be described with reference to its preferred embodiment in connection with the accompanying drawings.

DESCRIPTION OF THE PREFERRED EMBODIMENT

Figure 1:
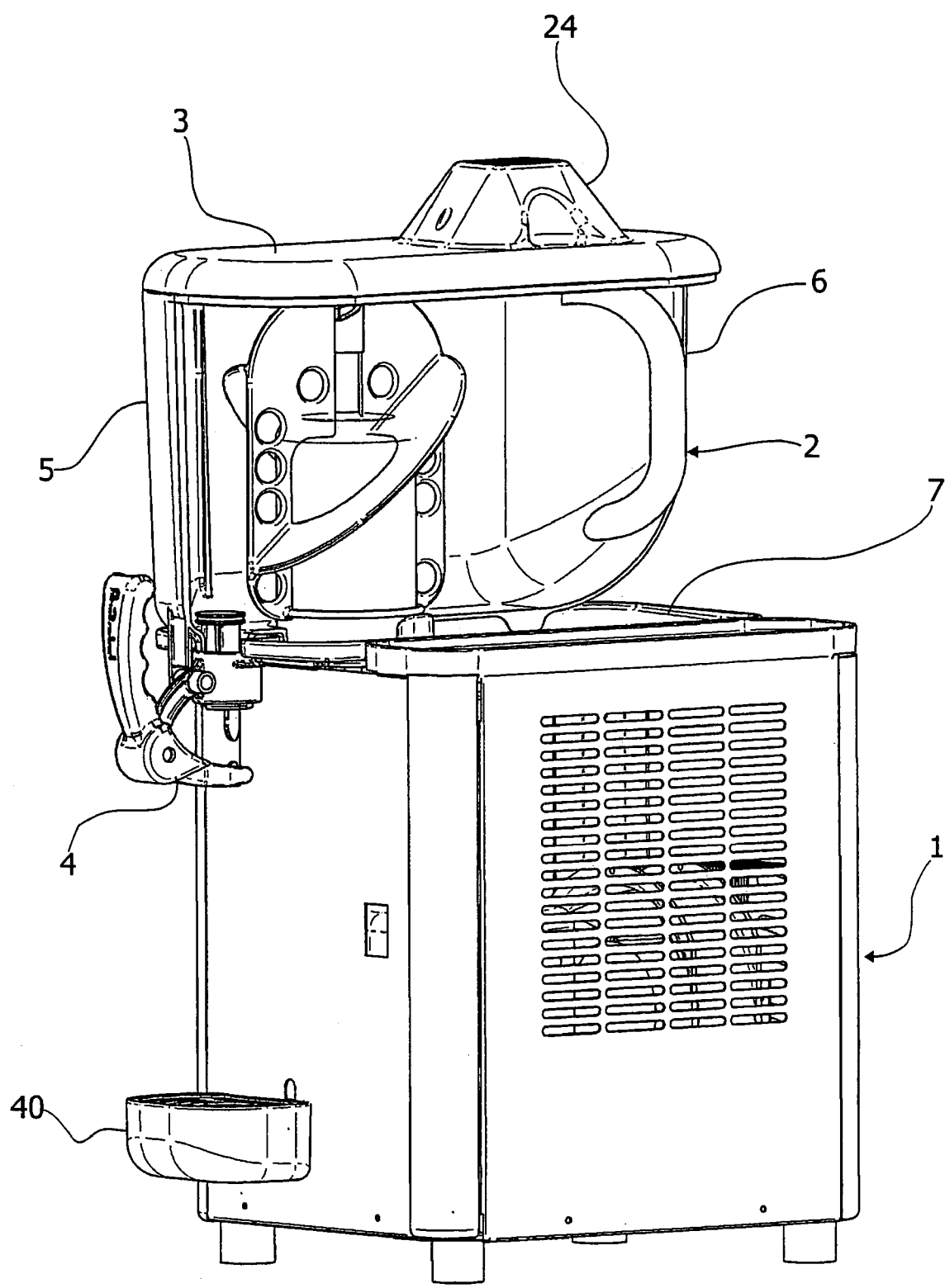
FIG. 1 is a diagrammatic perspective view of a granita production machine according to the invention.
Figure 2:
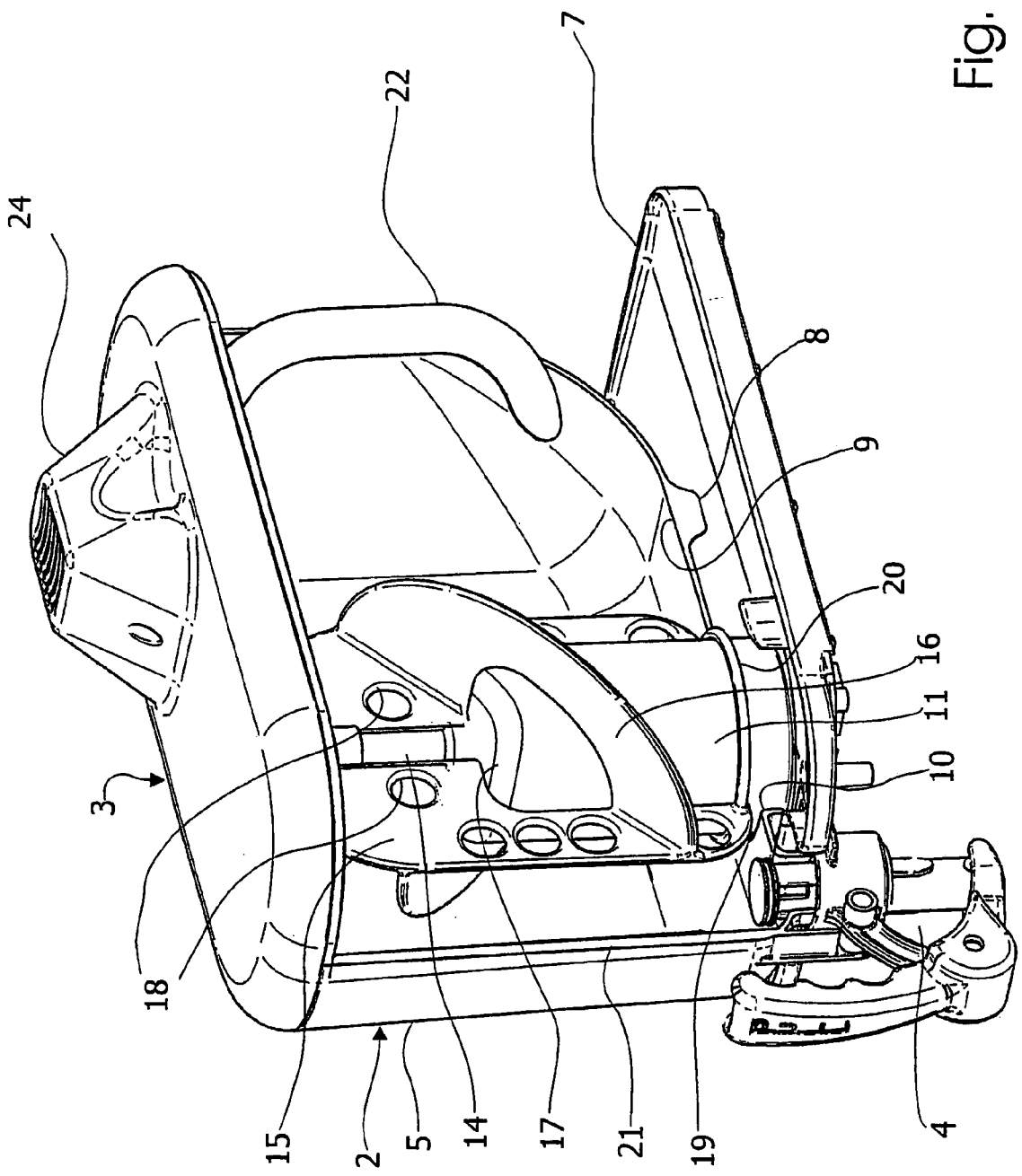
FIG. 2 is a fragmentary, longitudinally cross-sectioned, perspective view, showing a bowl of the granita production machine in FIG. 1.
Figure 3:
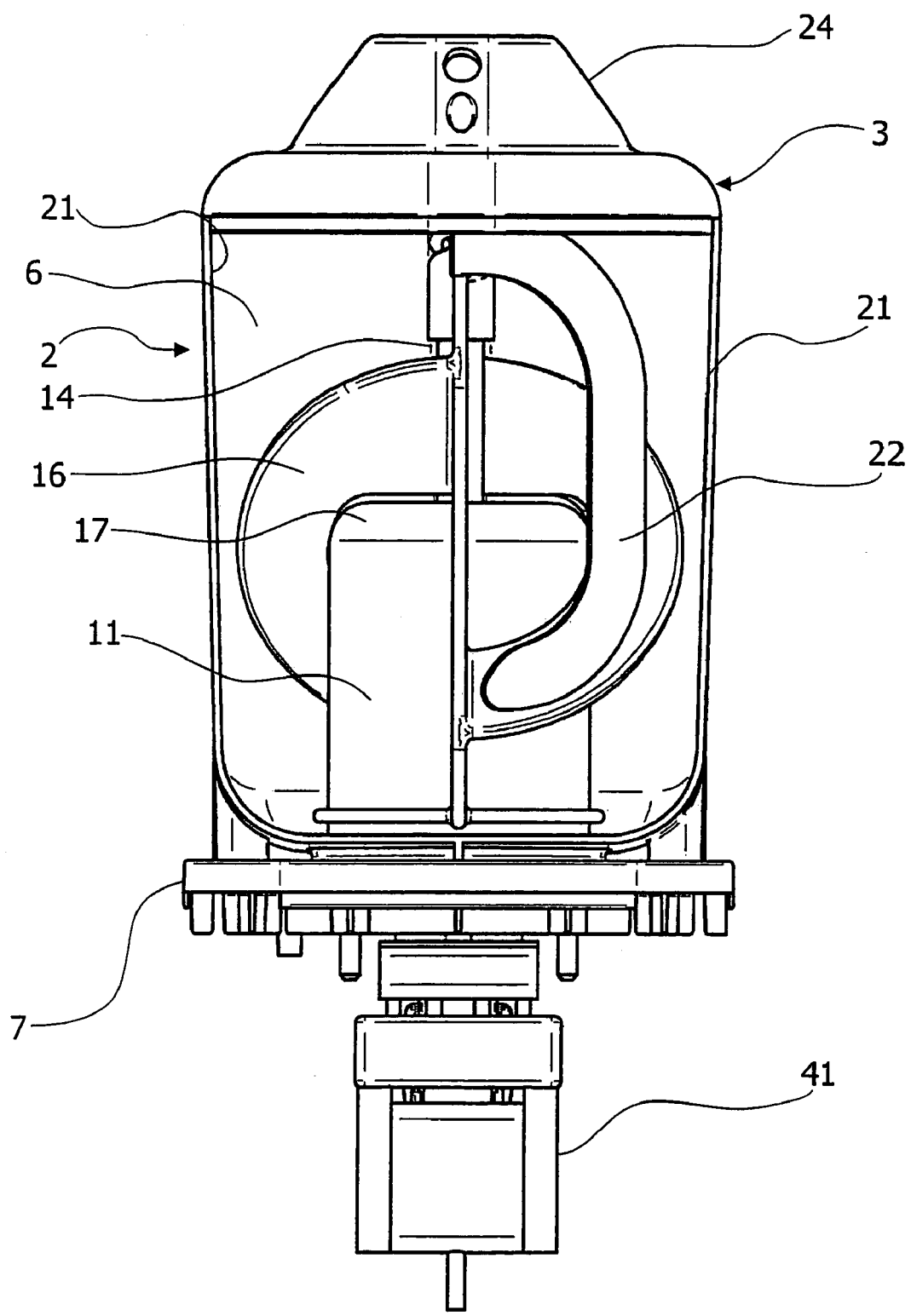
FIG. 3 is a fragmentary rear view of the machine in FIG. 1.
Figure 4:
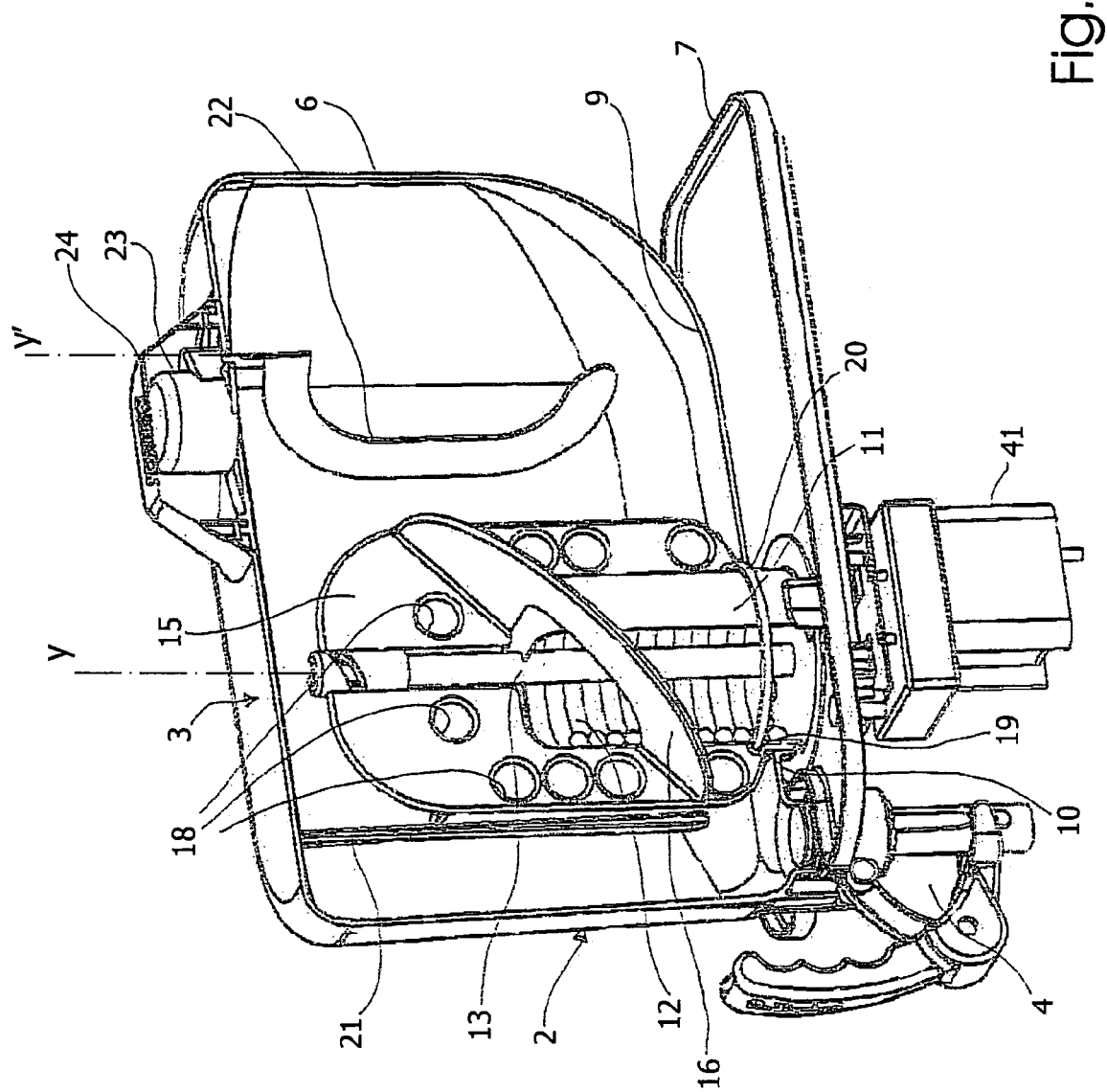
FIG. 4 is a perspective cross-section view of the machine in FIG. 3.

With reference to the drawing, in FIG. 1 a granita production machine is generally shown, which, according to the invention, includes a cooling drum being located not horizontally in the relative bowl, but with its longitudinal axis that is orthogonal with respect to the bottom of the bowl. This is best shown in FIGS. 2 to 4, whose fragmentary views are restricted only to the bowl.

In FIG. 1, a casing of the machine is indicated as 1 and a bowl as 2, which is supported by the machine casing 1. A refrigeration circuit and an electrical circuitry for machine control are contained in the machine casing 1. They are conventional and, for this reason, are neither shown nor described in detail.

The bowl 2 is usually made from transparent plastic material with low thermal conductivity and is designed to receive a water solution to be transformed into a granita. The bowl 2 is provided with both a cover 3 and a tap 4 for dispensing the granita. A small drip tray 40 is underneath the dispensing tap 4.

The bowl 2 is shaped like a prism having rounded edges and a substantially rectangular plan. A front side 5 facing a user of the machine and having the dispensing tap 4, and a rear side 6 of the bowl are both narrower than right-hand and left-hand sides of the bowl. Thus, the bowl is extended vertically having side walls, near which, as described below, removing means to remove crystals of iced solution are located in a front zone near the dispensing tap 4, and stirring means to stir a produced soft mass or slush are located in the opposite rear side of the bowl.

The bowl 2 is best shown in FIG. 2, where its walls are cross-sectioned by a vertical longitudinal plane. A base plate 7 acts as a bearing element for the bowl 2, since the bowl 2 rests through its feet 8, projecting from its bottom 9, on the base plate 7. A cooling drum 11 is received in a suitable seat 10, which is formed in the bottom 9 of the bowl in the front part thereof. The cooling drum 11 is arranged with its longitudinal axis y (FIG. 4) lying in an orthogonal direction with respect to the bottom 9 of the bowl, even if it could be placed eventually with another inclination near to the orthogonal direction with respect to the same.

As best shown in FIG. 4, the cooling drum 11 contains inside, as already known, a coil 12 which is the evaporator of the refrigeration circuit. Pivotally mounted inside the cooling drum 11 is a rotating shaft 13 that is driven by a geared motor 41 located within the machine casing 1.

The rotating shaft tightly projects from the cooling drum 11 at the top thereof by an upper projecting portion 14. Removably connected to the projecting portion 14 is the removing means able to remove the crystals of the iced solution that have been formed on the external surface of the cooling drum 11. The removing means includes at least one mainly scraping member 15, which is situated according to a central longitudinal plane of the cooling drum 11, and at least one mainly conveying member 16, which is inclined with respect to the mainly scraping member 15 and connected thereto.

As shown also in FIGS. 2 and 3, the mainly scraping member 15 is essentially a reversed U-shaped blade, which is mounted vertically to the upper projecting portion 14 of the rotating shaft 13. The blade of the scraping element 15 can be made in two parts that are joint at the core of the U-shape. The internal profile of the reversed U-shaped blade closely follows the contour of the cooling drum 11, to skim it, which has a tapered upper portion 17. Therefore, the U-shaped blade core is in contact with the surface of this upper portion 17, and U-shaped blade flanges are constrained to turn around the side surface of the cooling drum 11.

The U-shaped blade of the scraping element 15 has a plurality of through holes 18, which are passed through particularly by a liquid part of the granita soft mass. In this way the granita is helped in being mixed and in reaching the wall of the cooling drum.

In order to assure the adherence of the scraping element 15 with the cooling drum 11, the flanges of the U-shaped blade of the scraping element 15 have internally a recess 19 for an engagement with a complementary circumferential protrusion 20 of the cooling drum 11.

To complete the removing means, the mainly conveying element 16 is joined to the mainly scraping element 15. In the embodiment shown, the conveying element 16 comprises a couple of G-shaped blades which are symmetrically fixed to the U-shaped blade of the scraping element 15 in both one and other side thereof. The G-shaped blades are inclined to the vertical direction and opposed to each other orthogonally with their concavities. The general G-shape is due to that a part of the blades is above the upper portion 14 of the cooling drum 11 that is designed to be skimmed by the blades being constrained to rotate with the U-shaped blade.

It should be appreciated that also the mainly conveying element serves to remove the crystals of the iced solution from the surface of the cooling water. However, its principal function is to convey the crystals removed by the U-shaped blade towards the dispensing tap 4 as clearly shown in FIG. 4. To make easier such a conveyance, a plurality of enlargements 21 are made advantageously on the internal side of the wall of the bowl 2, in a front zone thereof, adjoining the cooling drum 11 and above said dispensing tap 4. The enlargements 21, being extended preferably in a vertical direction, serve to withstand the movement of granita and increase its pressure to promote its outflow when the tap 4 is opened. Such a tap, which is integral to the bowl, has a vertical operation. The axis of the tap is parallel to the bias exerted by the mainly conveying element. As seen in FIG. 3, these enlargements 21 reduce further the passageway area for granita.

In FIGS. 3 and 4 it is also clearly shown that the bottom 9 rises from the front part to the rear one of the bowl 2.

In this way, the liquid part that has to be cooled can be collected on the front part in contact with the cooling drum.

With a horizontally elongated bowl 2 according to the present embodiment, a stirring vane 22 to stir granita is dependent in a rear zone of the bowl. This stirring vane 22, which is generally C-shaped, is pivotally supported by the bowl cover 3 and is driven by a geared motor 23 which is housed centrally along the longitudinal axis y' in the same cover 3 under a cap 24. The stirring vane is rotated around a vertical axis passing through the free ends of the C-shape. In particular, the bottom 9 of the bowl 2 is horizontally tapered and inclined upwards in its zone underneath the stirring vane 22.

The control of the density of the granita soft mass is performed by devices usually known in the art.

The granita production machine according to the invention has been represented and described in one of its embodiments, and modifications, variations and omissions can be made without departing from the spirit of the present invention set forth in the enclosed claims.

What is claimed is:

1. A machine for producing granita and similar beverages, comprising a machine casing (1) including a refrigeration circuit and an electrical circuitry for the machine control, and a bowl (2) designed to receive a water solution to be transformed into a granita, having a bottom (9), a cover (3) and a granita dispensing tap (4) and containing a cooling drum (11) with high heat-exchange, the cooling drum (11) being crossed along its longitudinal axis by a rotating shaft (13) to which removing means are mounted to remove, by skimming, crystals of iced solution formed on the surface of the cooling drum (11), characterized in that said cooling drum (11) has its longitudinal axis (y) lying substantially orthogonal to the bottom (9) of the bowl (2), and said removing means includes at least one mainly scraping element (15) situated on a longitudinal central plane with respect to the cooling drum (11) and at least one mainly conveying element (16), which is inclined with respect to the mainly scraping element (15) and connected thereto.

2. The machine according to claim 1, characterized in that said rotating shaft (13) is driven around an axis (y) by a first geared motor (41) located inside the machine casing (1).

3. The machine according to claim 1, characterized in that said mainly scraping element (15) is a reversed U-shaped blade, provided with through holes (18), a U-shaped blade core being supported by said rotating shaft (13) and U-shaped blade flanges being constrained to rotate around the cooling drum (11) by their recess (19) in engagement with a complementary circumferential protrusion (20) of the cooling drum (11).

4. The machine according to claim 3, characterized in that said mainly conveying element (16) comprises a couple of G-shaped blades which are symmetrically fixed in an inclined position to the U-shaped blade in both one and other side thereof, the blades being opposed to each other orthogonally with their concavities.

5. The machine according to claim 1, characterized in that the bowl (2), being horizontally elongated and having vertical walls close to the periphery of the removing means and rounded edges, has in its internal side, adjoining the cooling drum (11) and above said dispensing tap (4), a plurality of vertical enlargements (21) withstanding the granita movement by said removing means.

6. The machine according to claim 1, characterized in that a granita stirring vane (22), being pivotally supported by the bowl cover (3) and rotated around an axis by a second geared motor (23) housed centrally along a longitudinal axis in the same bowl cover (3), is dependent in the bowl (2) in a part opposite to the dispensing tap (4), with respect to the cooling drum (11).

7. The machine according to claim 6, characterized in that the said stirring vane (22) is a C-shaped element and its rotation axis (y') is vertical and passes through free ends of the C-shape.

8. The machine according to claim 6, characterized in that the bottom (9) of the bowl (2) is horizontally tapered and inclined upwards in its area underneath said stirring vane (22).

* * * * *